July 31, 1962    W. L. CARLSON, JR    3,047,779
ELECTROMAGNETIC DEVICE
Filed May 27, 1959

INVENTOR.
WILLIAM L. CARLSON, JR.

BY Alfred N. Feldman

ATTORNEY

United States Patent Office 3,047,779
Patented July 31, 1962

3,047,779
ELECTROMAGNETIC DEVICE
William L. Carlson, Jr., Bloomington, Minn., assignor to Minneapolis-Honeywell Regulator Company, Minneapolis, Minn., a corporation of Delaware
Filed May 27, 1959, Ser. No. 816,245
6 Claims. (Cl. 317—156)

The present invention is directed to an electromagnetic device which can be used as an actuator or relay. The device utilizes an unusual induction type of energization which allows for a form of differential operation.

While many types of relays and magnetic actuators are known, it is common to utilize only a single operating principle in any one of these devices. The presently disclosed electromagnetic device utilizes a combination of two beneficial features from the magnetic arts. The present electromagnetic device combines the features of an induction type relay or actuator with the beneficial aspects of a transformer type actuator or relay. In its simplest form the present device can be considered as a shorted conductor supported in a magnetic circuit so that a flux induced in a center leg of the circuit links a shorted conductor. If no other influences were involved, the linkage of the magnetic flux with the shorted conductor would create a balanced condition and the shorted conductor would remain stationary. This condition of balance can be readily upset by providing disrupting effects on the magnetic circuit so that an unbalance of flux can be created. When an unbalance exists the shorted conductor can be caused to move in a direction appropriate to the type of unbalance that exists. This movement can then be in turn connected to a switch to provide an unusual type of relay.

The reason that the present device provides a relay or actuator of unusual design is that a change in power to the relay, such as a power interruption and a subsequent restoration of power, will not change the position of the actuator or relay. The change in position is accomplished through control of one or more external circuits that are designed for this purpose.

It is a primary object of the present invention to disclose an actuator that operates on a new and unusual principle.

A further object of this invention is to provide a relay wherein a power failure and a subsequent return of power will not change the position of the relay contacts.

Another object of the present invention is to provide an actuator which is stable upon changes of energization and which can be operated only at the control of specified external circuitry.

Yet a further object of the present invention is to disclose an actuating device that is capable of operating on the differential loading or control of two separate circuits.

An additional object of this disclosure is to provide for a relay or actuator that is completely quiet in operation as it has no mechanical stops which can be struck when the device is operated.

These and other objects will become apparent when the present specification is considered in view of the attached drawing.

Figure 1:
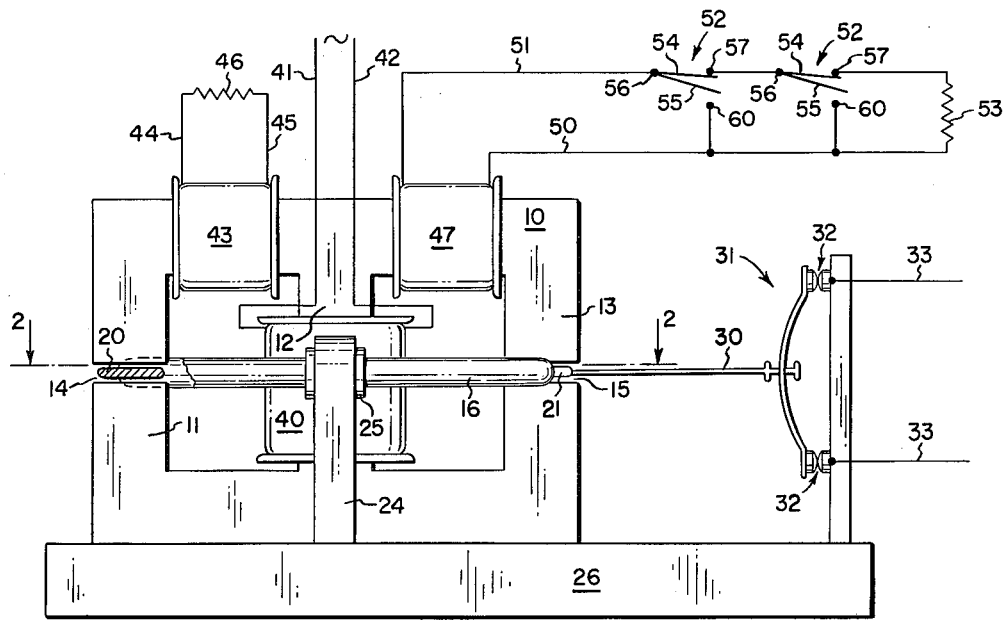
FIGURE 1 is a partially schematic side view of a relay incorporating the novel teaching. This figure further incorporates part of a control circuit.
Figure 2:
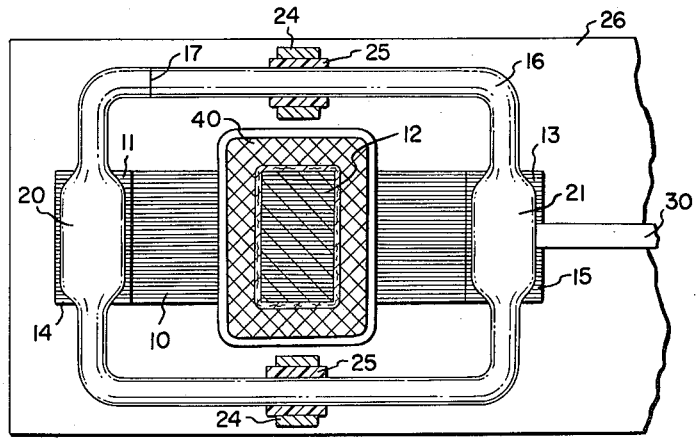
FIGURE 2 is a partial cross section of FIGURE 1 along lines 2—2.

The device disclosed in FIGURES 1 and 2 is a relay which can be used effectively in a circuit disclosed in a copending application. This application is entitled "Remote Control Apparatus" and was filed December 26, 1957, with a serial number of 705,440, now Patent No. 2,923,855. The circuit of the previously filed application forms no part of the present invention even though it is partially disclosed as a means of obtaining continuity, and as a disclosure of one specific example of the utility of the present device.

In the preferred embodiment disclosed there is provided a laminated magnetic member or core 10. Core 10 has three legs 11, 12, and 13. While the present core 10 has been disclosed as a laminated three-legged member, it should be understood that any type of magnetic core having a plurality of legs could be utilized in the present device. The legs 11 and 13 have air gaps 14 and 15 into which is placed an armature 16.

The armature 16 is formed of a conductive rod which is joined at 17 to form a shorted electrical path. The armature 16 has two flattened portions 20 and 21. The flattened portions 20 and 21 of the armature 16 generally correspond in size to the cross section of the legs 11 and 13 of the core 10. The flattened portions 20 and 21 are positioned so that they can simultaneously lie in the center of the two air gaps 14 and 15.

The armature 16 is supported by a pair of posts 24 which have bearings 25 inserted therein and which encircle two opposite legs of the armature 16. The bearings 25 are sufficiently long to support the armature 16 so that it can be moved from side to side, as viewed in FIGURE 1 of the drawing. The posts 24 are supported on any convenient surface or block 26. The magnetic core 10 is supported on the same block 26 and is rigidly attached thereto so as to maintain the fixed relationship as shown in the drawing.

Attached to the flattened portion 21 of armature 16 is a connecting member 30 which operates a switch generally shown at 31. The switch represented is of any over center type and its details are relatively immaterial. The switch contacts 32 control a circuit 33 operating any convenient device. It is understood that the switch represented at 31 as an over center switch could be of any design and if the over center mechanism is needed it could be incorporated in the mounting of armature 16 in place of the posts 24 and the bearings 25. Since the details are illustrative only of one preferred embodiment and the invention is not limited to that embodiment, no further description of this area is believed necessary as those skilled in the art could readily provide the necessary mounting and switch details.

Encircling the leg 12 of the magnetic core 10 is a primary energizing coil 40. The coil 40 can be of any convenient design and is shown as wires 41 and 42 leading to a conventional bobbin wound type of coil. The leads 40 and 41 are energized by any convenient source of alternating current and act as the primary or energizing source for the electromagnetic device.

A coil 43 is wound on part of leg 11 and has conductors 44 and 45 leading to an impedance 46 in the form of a resistor. The circuit incorporating leads 44, 45 and impedance 46, has been disclosed for convenience' sake as a fixed circuit, but it is understood that any variable impedance could be placed across the coil 43 to obtain the operation of the unit. This will become apparent when a description of the operation is covered in the subsequent material. A second coil 47 is provided around leg 13 of core 10 and has output leads 50 and 51. The output leads go to switches 52 and a fixed impedance 53. The conductor 50 is common to one side of each of the switches 52 and to the impedance 53.

Since the switches 52 are slightly different than conventional switch arrangements, they will be described in some detail. The switch arms or blades 54 and 55 are attached to one another and pivot about the point 56. The blade 54 is in contact with a terminal 57 in the normally unoperated position of switch 52. The blade 55 is normally not in contact with terminal 60. When the switch blade 54 is depressed the blades 54 move toward the terminal 60. This movement then opens the circuit between the pivot 56 and the terminal 57. When blade 54 is released it returns to the position shown in FIGURE 1. Blade 55 can be momentarily moved to contact 60 without causing blade 54 to move. This movement completes a circuit between terminals 56 and 60.

There may be as many switches 52 as desired and each of the switches is operated independent of one another. It becomes obvious that in their normal position the switches 52 complete a circuit from the coil 47 through conductors 51 to the impedance 53 and back to the coil 47 through the conductor 50. If any of the blades 54 are operated the circuit just described is broken and the coil 47 is open circuited. The blade 55 can connect the pivot 56 and a terminal 60 and short-circuit coil 47.

*Operation*

In discussing the operation of the present electromagnetic device, it will be assumed that the armature 16 is placed as shown in FIGURES 1 and 2 and that an alternating current is supplied to conductors 41 and 42. It will be further assumed that the coils 43 and 47 are identical and that the impedances 46 and 53 are both resistive loads of equal value. With the arrangement as described and with switches 52 in the position shown, the core 10 with the coils 40, 43, and 47 form a transformer with equally distributed magnetic flux in the legs 11 and 13. Since the flux generated by coil 40 divides into the legs 11 and 13 and since the impedance in both of these legs is equal, it becomes obvious that the flux distribution is equal on each side of the core 10.

The armature 16 is a circular, complete, short circuit that passes equally through the air gaps 14 and 15 thereby linking equal amounts of magnetic flux on both sides or in the air gaps 14 and 15. As such, any electrical currents induced in the armature 16 balance one another and the reaction of the induced current in the armature 16 is equal and opposite to the induced effect on the opposite sides of the device. Since both sides of the unit have equal and opposite forces induced in them by the interaction of the currents and magnetic fields, the armature 16 is stationary.

It becomes obvious that if this balance is disrupted, that the current induced in the armature 16 reacting with an unbalanced flux in the core 10 will cause an unbalanced force to exist on the armature 16 along the direction of the connecting member 30. This unbalance can be accomplished by operating either of the switches 52 which short out the coil 47. If the coil 47 is shorted out, the impedance of the core leg 13 becomes much greater than the impedance of the core leg 11 and more flux is distributed through the circuit incorporating the air gap 14. As this increase in flux occurs, the reaction of the current induced in the armature 16 becomes greater on the side of the unit which incorporates the air gap 14 than on the side which incorporates the air gap 15. As such, a force is developed along the connecting member 30 and the armature 16 moves to overcome the unbalance.

At this point if a power failure were to occur thereby removing the power from conductors 41 and 42, there would be no force on the armature 16 tending to move it from the position to which the magnetic forces had previously set the armature. If the power is then restored, the forces become balanced in the conductor or armature 16 and again the armature does not move. As such, the presently disclosed electromagnetic device is insensitive to power failures and re-establishment of power and operates solely under the control of the switches 52. If the switches 52 are moved from the short position back to the position shown, the balance of flux tends to re-establish itself equally in the legs 11 and 13 of the core 10. This reestablishment of a balanced condition causes an unbalanced force on the armature 16 since the flattened portions 20 and 21 of armature 16 have been moved from their centrally located position within the air gaps 14 and 15. As such, the unbalance tends to restore the armature 16 to the position shown, thereby obtaining the second operation of the actuator or relay.

It becomes obvious in the operation of the disclosed device that there are no mechanical stops on the unit and thereby any possible clatter or mechanical noise is eliminated. This makes the unit exceedingly quiet and overcomes a problem commonly inherent in magnetic operators and relays. This unit in balancing the alternating current fluxes eliminates the need for shading coils and similar devices.

The present invention is subject to many modifications that would readily occur to one skilled in the art. Since the present disclosure is but a single, preferred embodiment of the invention, the applicant wishes to be limited in scope in the present invention to the appended claims.

I claim as my invention:

1. In a relay of the class described: a laminated magnetic core in the shape of a figure 8; said core having an air gap in each of two outside legs and said air gaps being substantially in the same plane; a single electrical energizing winding on a center leg of said core; substantially identical electrical output windings on each of said two outside legs and said output windings wound to have substantially identical voltage outputs when said energizing winding is connected to an electrical source; an armature forming a closed electrical circuit passing through said air gaps and encircling said center leg of said core; support means arranged to hold said armature in said air gaps; said support means further allowing said armature means to move into and out of said air gaps; switch means connected to said armature; fixed impedance means continuously electrically loading one said output winding; variable impedance means electrically loading said second output winding; and said armature having an electrical current induced in it which reacts with a magnetic flux induced across said air gaps by said energizing winding and said source; said armature shifting in said air gaps to operate said switch means whenever the variable impedance means varies the loading of said second output winding.

2. In a device of the class described: a laminated magnetic core having three legs; said core having an air gap in each of two outside legs and said air gaps being substantially in the same plane; a single electrical energizing winding on a center leg of said core; substantially identical electrical output windings on each of said two outside legs and said output windings wound to have substantially identical voltage outputs when said energizing winding is connected to an electrical source; an armature forming a closed electrical circuit passing through said air gaps and encircling said center leg of said core; support means arranged to hold said armature in said air gaps; said support means further allowing said armature to move into and out of said air gaps; first impedance means continuously electrically loading one said output winding; variable impedance means electrically loading said second output winding; and said armature having an electrical current induced in it which reacts with a magnetic flux induced across said air gaps by said energizing winding and said source; said armature shifting in said air gaps whenever the impedance means differentially vary the loading of said output windings.

3. In a device of the class described: laminated magnetic core means having a plurality of legs; said core means having an air gap in each of the two outside legs; a single electrical energizing winding on a center leg of said core; electrical output windings on each of said two outside legs and said output windings wound to have outputs when said energizing winding is connected to an electrical source; an armature forming a closed electrical circuit passing through said air gaps and encircling said center leg of said core means; support means arranged to hold said armature in said air gaps; said support means further allowing said armature means to move into and out of said air gaps; first impedance means continuously electrically loading one said output winding; variable impedance means electrically loading said second output winding; and said armature having an electrical current induced in it which reacts with a magnetic flux induced across said air gaps by said energizing winding and said source; said armature shifting in said air gaps whenver the impedance means differentially vary the loading of said output windings.

4. In a relay of the class described: magnetic core means having a plurality of legs; said core means having an air gap in each of two outside legs; a single electrical energizing winding on a center leg of said core means; electrical output windings on each of said two outside legs and said output windings wound to have voltage outputs when said energizing winding is connected to an electrical source; armature means forming a closed electrical circuit passing through said air gaps and encircling said center leg of said core means; support means arranged to hold said armature means in said air gaps; said support means further allowing said armature means to move into and out of said air gaps; switch means connected to said armature means; first circuit means connected to one said output winding; second circuit means electrically connected to said second output winding; and said armature means having an electrical current induced in it which reacts with a magnetic flux induced across said air gaps by said energizing winding and said source; said armature shifting in said air gaps under the influence of said induced current and said magnetic flux to operate said switch means.

5. In a device of the class described: magnetic core means having a plurality of legs; said core means having an air gap in each of two outside legs; a single electrical energizing winding on a center leg of said core means; electrical output windings on each of said two outside legs and said output windings wound to have voltage outputs when said energizing winding is connected to an electrical source; armature means forming a closed electrical circuit passing through said air gaps and encircling said center leg of said core means; support means arranged to hold said armature means in said air gaps; said support means further allowing said armature means to move into and out of said air gaps; first circuit means connected to one said output winding; second circuit means electrically connected to said second output winding; and said armature means having an electrical current induced in it which reacts with a magnetic flux induced across said air gaps by said energizing winding and said source; said armature shifting in said air gaps under the influence of said induced current and said magnetic flux.

6. In a device of the class described: magnetic core means having a plurality of legs; said core means having at least an air gap in each of two outside legs; single energizing means on a center leg of said core means; electrical output means magnetically coupled to said core means to have a voltage output responsive to said energizing means; armature means forming a closed electrical circuit passing through said air gaps and encircling said center leg of said core means; support means arranged to hold said armature means in said air gaps; said support means further allowing said armature means to move into and out of said air gaps; circuit means electrically connected to said output means; and said armature means having an electrical current induced in it which reacts with a magnetic flux induced across said air gaps by said energizing means; said armature shifting in said air gaps under the influence of said induced current and said magnetic flux.

References Cited in the file of this patent
UNITED STATES PATENTS

| | | |
|---|---|---|
| 1,910,639 | Rose | May 23, 1933 |
| 1,941,273 | Prince | Dec. 26, 1933 |
| 2,064,018 | Leylano | Dec. 15, 1936 |
| 2,066,760 | Blamberg | Jan. 5, 1937 |
| 2,762,000 | Matthews | Sept. 4, 1956 |
| 2,793,266 | Reichard | May 21, 1957 |